United States Patent [19]
Fleenor et al.

[11] 3,830,249
[45] Aug. 20, 1974

[54] TIRE INFLATOR DEVICE
[76] Inventors: Richard P. Fleenor, 19008 Withey Rd.; Charles M. Dwyre, 134 Cambrian View Way, both of Los Gatos, Calif. 95030
[22] Filed: Aug. 7, 1972
[21] Appl. No.: 278,643

[52] U.S. Cl................. 137/224, 137/316, 137/227
[51] Int. Cl............................................ F16k 15/20
[58] Field of Search.......... 137/224, 226, 383, 316; 152/415, 429

[56] References Cited
UNITED STATES PATENTS
| | | | |
|---|---|---|---|
| 1,246,131 | 11/1917 | Margton | 137/226 |
| 1,504,119 | 8/1924 | Hansen | 137/224 |
| 1,541,216 | 6/1925 | Hendricks | 137/383 |
| 2,954,796 | 10/1960 | Marshall | 137/226 |
| 3,592,218 | 7/1971 | Guy | 152/429 X |

*Primary Examiner*—Harold W. Weakley

[57] ABSTRACT

The invention is a simple inexpensive device comprised of a minimum number of parts which permit inflation of a pneumatic tire at a controlled rate; and, discharges surplus air from the tire after a predetermined pressure has been reached; and, makes an audible sound while the surplus air is being discharged.

1 Claim, 3 Drawing Figures

PATENTED AUG 20 1974  3,830,249

TIRE INFLATOR DEVICE

Filling low volume pneumatic tires, such as used on bicycles, from high pressure air hoses as used in service stations is hazardous because of the relatively short time required to overinflate and blow out a tire.

An object of this invention is to provide a simple inexpensive device to limit the pressure to which a pneumatic tire may be inflated.

Another object of this invention is to supply a device which gives off an audible sound when the desired tire pressure has been obtained while inflating the tire.

Another object of this invention is to limit the rate of air flow from a high pressure air hose to the tire.

Still another object of this invention is to supply a device which requires minimal installation for use. It is slipped over the valve stem before tire inflation and removed immediately after use.

These and other objects of the invention will become apparent from the following description in which.

Figure 3:
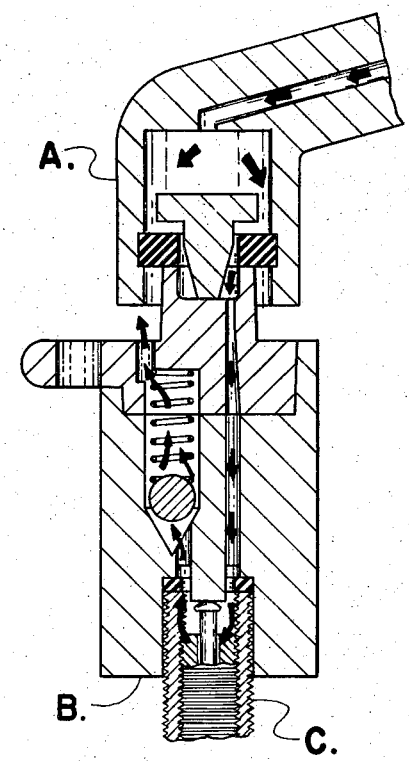

FIG. 3 is a longitudinal cross-sectional view of the device while in use. The device B. is shown in position over a pneumatic tire valve stem C with a air hose chuck A in position over the device B. A suitable force on the air hose chuck A in the direction of the pneumatic tire valve stem C is required to put the device in use. This figure shows the device while surplus air is being exhausted from the tire.

Figure 1:
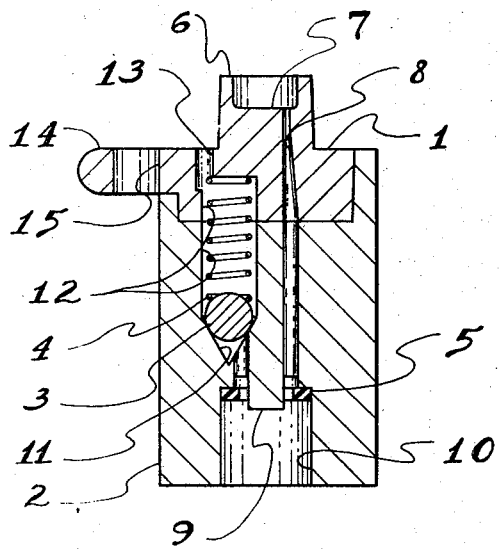
FIG. 1 is a longitudinal cross-sectional view of the device.
Figure 2:
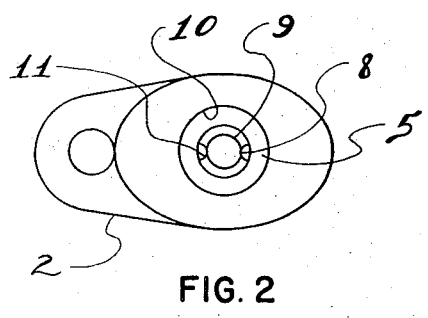
FIG. 2 is a view of the end of the device which fits over the pneumatic tire valve stem when the device is in use. This view shows the air passages which allow air to flow into and out of the tire.

As seen in FIG. 1, the device is comprised of molded top 1, molded body 2, pressure relief ball 3, compression spring 4, and resilient seal 5. The molded top 1 is bonded to the molded body 2 in a fashion to obtain an air tight seal between the two parts.

The cylindrical protrusion 6 seats into the air hose chuck A and forms an air tight seal with the air hose chuck when a suitable force is applied to the chuck in the direction of the pneumatic tire valve stem. The cylindrical protrusion 6 contains a cavity 7 of suitable depth to open the air release valve in the air hose chuck A when such a valve exists. The air passes from the air hose chuck A into cavity 7, through air passage 8 in the molded top 1 and molded body 2, into the valve stem cavity 10. The entrance of air passage 8 is configured so as to restrict the flow of air from the air supply hose into the device.

The valve stem cavity 10 of the molded body 2 fits over the pneumatic tire valve stem C and when a suitable force is applied to the device by pushing down on the air hose chuck A in the direction of the pneumatic tire valve stem C an air tight seal is obtained between the device B and the pneumatic tire valve stem C by means of the resilient seal 5.

A cylindrical protrusion 9 within the valve stem cavity 10 of the molded body 2 unseats the pneumatic tire valve core when the device is in use. This allows the air to flow from the valve stem cavity 10 into the pneumatic tire valve stem C and into the tire.

An air passage 11 from the valve stem cavity 10 allows the air pressure within the tire to exert its force upon the pressure relief ball 3. The pressure relief ball 3 is maintained in a seated position by the force applied by the compression spring 4 until the air pressure within the tire exceeds the set pressure. This set pressure is determined by the amount of force which the compression spring 4 exerts on the pressure relief ball 3.

When the set pressure has been exceeded, the pressure relief ball 3 is unseated from body 2 and surplus air excapes from the tire around the pressure relief ball 3 into spring cavity 12 and exhausts through exhaust port 13. Exhaust port 13 is positioned relative to spring cavity 12 in such a manner so that an audible sound is produced when surplus air is exhausted from the tire through the pressure relief valve through the exhaust port.

The air flow while the pressure relief valve is functioning is illustrated by arrows in FIG. 3.

An extension 14 of the device with a through hole 15 is provided for placing the device on a key chain.

What is claimed is:

1. A device which may be placed between the valve stem of a pneumatic tire and a high pressure air hose to permit inflation of the tire and at the same time limit the pressure to which the tire is inflated comprising, in combination:

a. a molded plastic member comprised of a molded top segment and a molded body segment, the top segment having a cylindrical protrusion forming a first cavity about the top surface thereof, the protrusion extending from the top surface for engaging the air release valve of an air hose chuck when said air release valve is positioned in alignment with said first cavity such that air may be released from said air hose chuck to within said formed first cavity, a first air passage canal extending through said top segment and said molded body segment, said first air passage having a restricted entrance at said first cavity and an exit at a second cavity formed in said body segments, the restricted entrance of the first passage canal being tapered to decrease the cross-sectional dimension thereof and restrict air into said first canal, said second cavity being formed in said body segment to receive the end of a valve stem of a pneumatic tire, a protrusion extending from said body segment to within said second cavity to unseat a valve core of a pneumatic tire valve when said tire valve is positioned within said second cavity in alignment with said protrusion; a second air passage canal extending through said top segment and said body segment, said second air passage being positioned laterally relative to said first passage with an entrance at said second cavity and an exhaust port opening to the exterior of said top segment, said second air passage canal forming a spring cavity intermediate the ends thereof and a seat within said body segment for receiving a valve, said spring cavity being formed in part by said top segment and in part by said body segment and being of increased cross-sectional diameter relative to the entrance of the second air passage, said top segment and said molded body segment being sealed together with their respective segments of the first air passage canal and the spring cavity in coaxial alignment;

b. a compression spring positioned within said spring cavity, said spring being biased to a preset pressure dependent upon the maximum desired air pressure of the pneumatic tire;

c. a pressure relief valve positioned about said seat for controlling passage of air through said second air passage and engaged about one end of said compression spring with said spring biased to support said valve in said seat to oppose air passage through said second passage; and d. a resilient ring seal positioned within said second cavity about the periphery of the bottom interior wall of said second cavity to provide an air seal about said second cavity and a valve stem of a pneumatic tire, said seal being further positioned to encompass the exit of the first air passage and the entrance of the second air passage such that with a valve stem positioned within said second cavity, the exit of the first passage and the entrance of the second passage communicate directly to within the valve stem.

* * * * *